United States Patent [19]

Wieties

[11] Patent Number: 5,120,454
[45] Date of Patent: Jun. 9, 1992

[54] COVERS FOR LIQUID WASTE RECEPTACLES WITH STRAINING CAPABILITY

[75] Inventor: David L. Wieties, Columbia, Ill.

[73] Assignee: Resourceful Environmental Ideas, Inc., Belleville, Ill.

[21] Appl. No.: 641,501

[22] Filed: Jan. 15, 1991

[51] Int. Cl.$^5$ .............................................. B01D 37/00
[52] U.S. Cl. .................................. 210/767; 210/102; 210/464; 222/189
[58] Field of Search .............. 210/767, 768, 780, 162, 210/163, 295, 464, 670, 651, 159, 473, 244, 238; 280/79.2; 222/189; 224/94 R, 90

[56] References Cited

U.S. PATENT DOCUMENTS

| | | | |
|---|---|---|---|
| 1,143,244 | 6/1915 | Wilson . | |
| 2,142,790 | 1/1939 | Kodaira | 222/11 |
| 2,191,395 | 2/1940 | Moser | 210/244 |
| 2,450,520 | 10/1948 | Maddux | 210/244 |
| 3,563,417 | 2/1971 | Jordan et al. | 222/189 |
| 4,240,568 | 12/1980 | Pool | 222/189 |
| 4,319,762 | 3/1982 | Streit et al. | 210/464 |

Primary Examiner—Robert A. Dawson
Assistant Examiner—Ana Fortuna
Attorney, Agent, or Firm—Senniger, Powers, Leavitt & Roedel

[57] ABSTRACT

A cover for enclosing the open top of a container, such as a liquid waste receptacle. The cover comprises an annular support dimensioned to fit generally coaxially within the open top of the container. The annular support defines an opening for passage of materials therethrough and into the container. The cover further comprises a mechanism for releasably securing the annular support to the upper edge margin of the container, a straining element in the annular support having a straining area coextensive with substantially the entire area of the opening in the annulaar support for straining solid objects of a predetermined maximum dimension from entry into the container while permitting entry of liquids through the opening and into the container, a lid dimensioned for covering the opening in the annular support, and a hinge for securing the lid to the annular support. The lid is swung on the hinge between an open position in which the lid is positioned away from the opening in the annular support to provide access to the top of the container and a closed position in which the lid completely covers the opening in the annular support and seals against the annular support to prevent materials within the container from escaping the container.

13 Claims, 3 Drawing Sheets

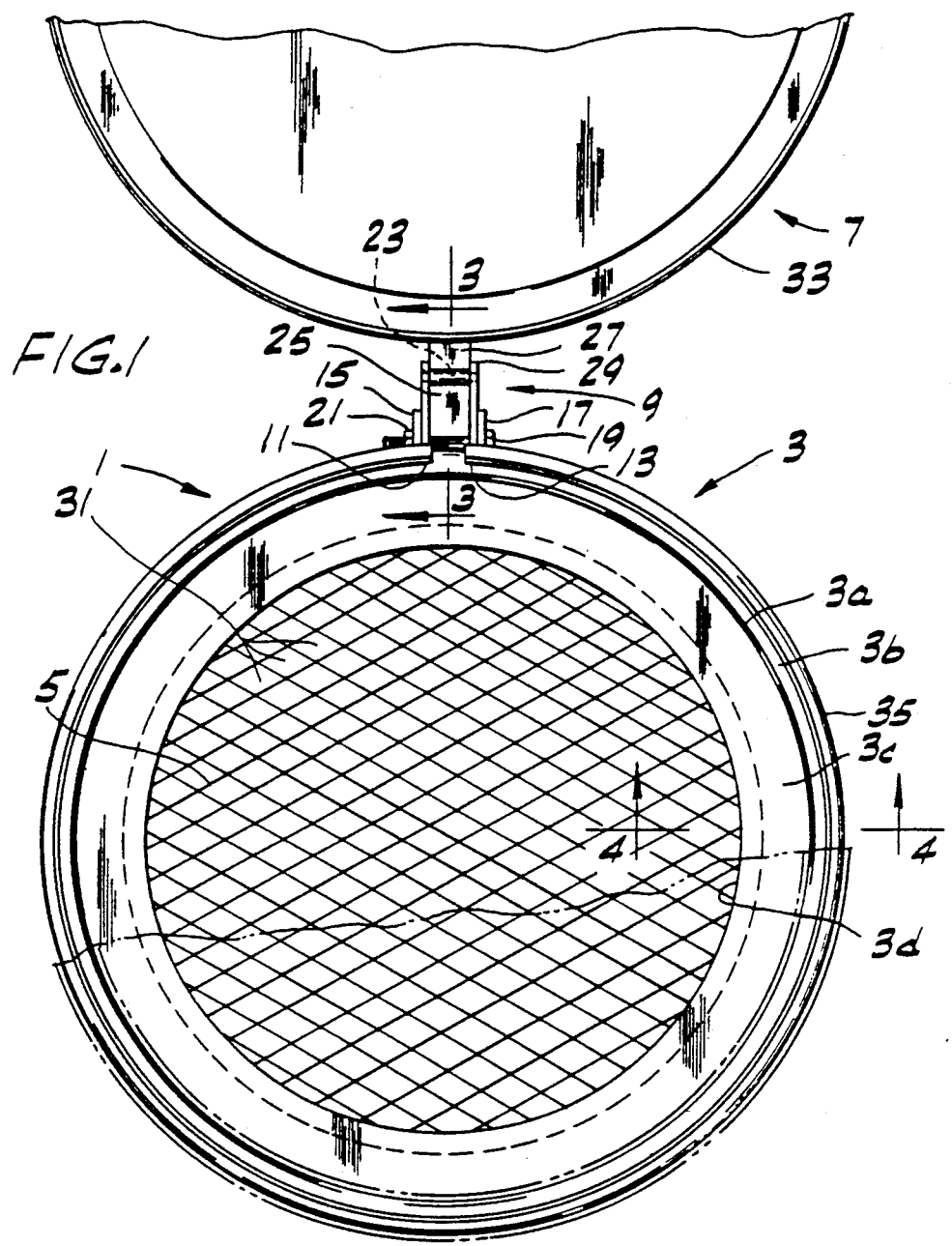
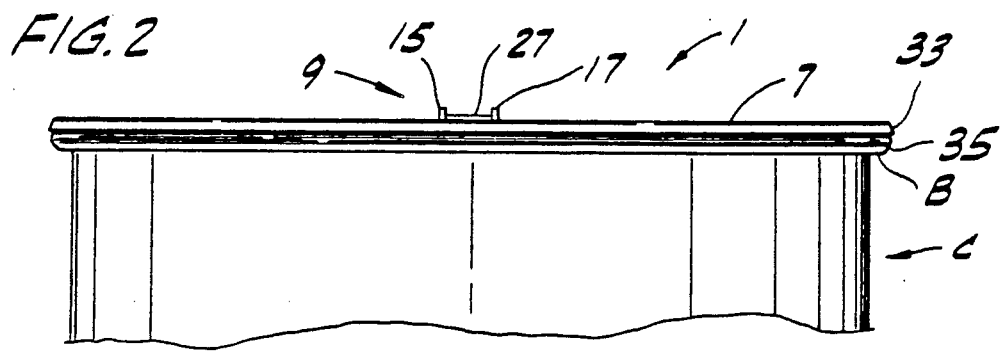

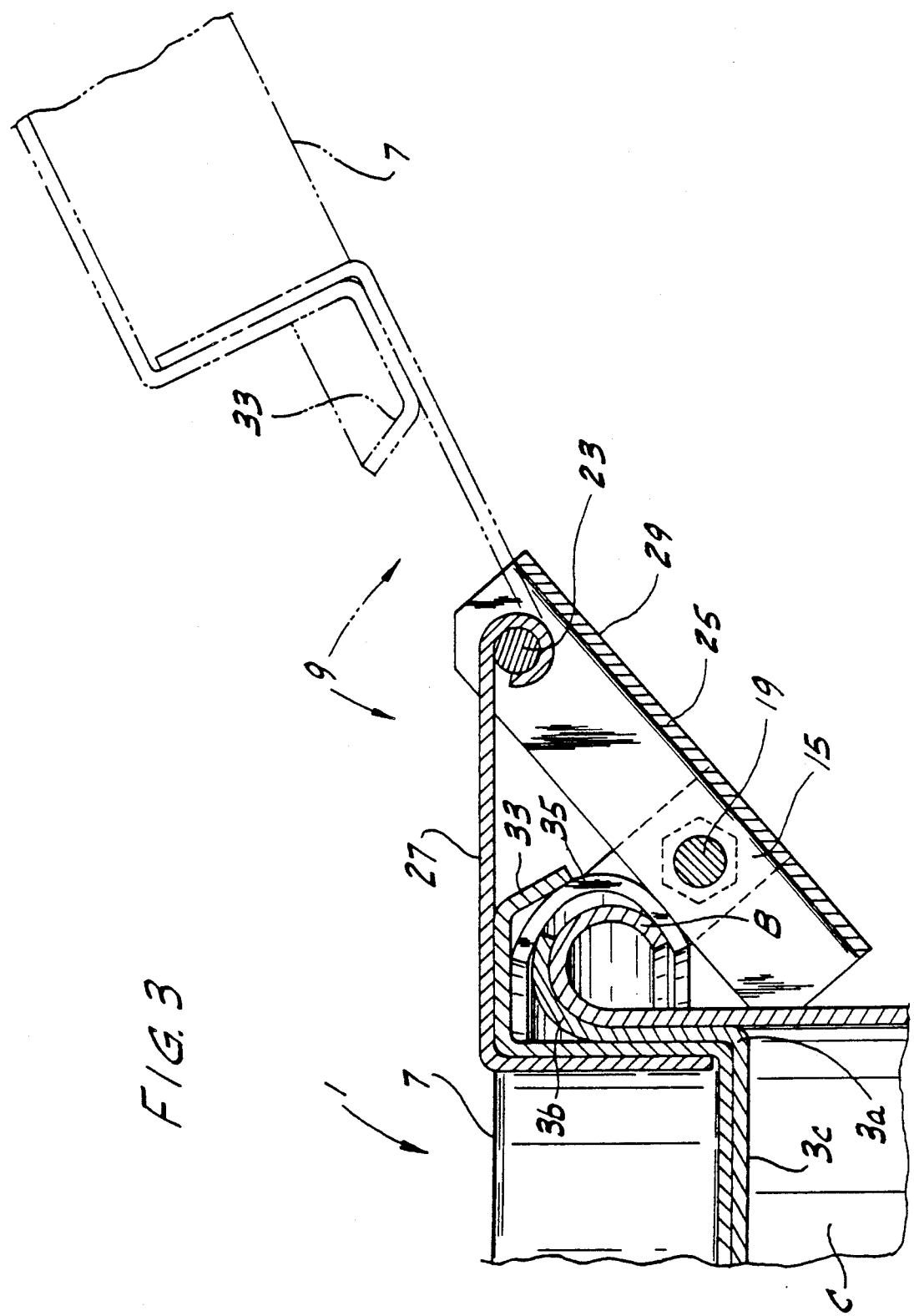

COVERS FOR LIQUID WASTE RECEPTACLES WITH STRAINING CAPABILITY

BACKGROUND OF THE INVENTION

This invention relates to covers for liquid waste receptacles, and more particularly to an improved cover which prevents accidental or negligent disposal of useful articles or other solid objects with the waste.

To protect the environment and the health of persons responsible for disposing of hazardous or toxic liquids, such liquid waste must generally be placed in specially designated drums. To avoid accidental spillage or the escape of noxious fumes from the container, the liquid waste drum is preferably closed at all times except when it is necessary to add or remove waste. Thus, the conventional liquid waste receptacle is generally equipped with a cover.

Careless personnel are prone to drop solid objects, such as plastic items, disposable protective work gloves, or glass bottles containing the liquid waste into the waste container along with the liquid waste. These solid objects must subsequently be separated from the liquid waste, resulting in added labor to the company or, where the company contracts for the removal of such liquid wastes, a surcharge for the additional labor entailed in the separation process will usually be added.

SUMMARY OF THE INVENTION

Among the several objects of the present invention may be noted the provision of an improved cover for use with containers such as liquid waste receptacles; the provision of such a cover which permits entry of liquid waste into the receptacle, but effectively strains solid objects from entry into the receptacle; and the provision of such a cover which may be releasably attached to containers so that the cover may be moved from one container to another as the need arises.

Briefly, therefore, the present invention is directed to a novel cover for use with a container, such as a liquid waste receptacle, which container has an upper edge margin defining an open top of the container. The cover includes an annular support dimensioned to fit generally coaxially within the open top of the container and includes means for releasably securing the annular support to the upper edge margin of the container. The annular support defines an opening through which materials may pass into the container. A straining element is located in the annular support and has a straining area coextensive with substantially the entire area of the opening in the annular support. The cover further comprises a lid dimensioned for covering the opening in the annular support, and hinge means for securing the lid to the annular support. The straining element resists entry of solid objects of a predetermined maximum dimension into the container, but permits entry of liquids through the opening and into the container. The lid is movable on the hinge means between an open position in which the lid is swung away from the opening in the annular support to provide access to the top of the container and a closed position in which the lid completely covers the opening in the annular support and seals against the annular support to prevent materials within the container from escaping the container.

The invention is further directed to a method for disposing of liquid wastes. The method comprises providing for use with a liquid waste container having an upper edge margin defining an open top, the cover as described above. The cover is installed on the open top of the container, and liquid waste is dispensed through the straining element of the cover and into the container, thereby straining solid objects having a predetermined maximum dimension from entry into the container.

Other objects and features will be in part apparent and in part pointed out hereinafter.

BRIEF DESCRIPTION OF THE DRAWINGS

FIG. 1 is a top plan view of the cover of this invention in its open position atop a container;

FIG. 2 is a front elevational view of the cover of FIG. 1 in its closed position;

FIG. 3 is a cross-sectional view taken along the plane of line 3—3 of FIG. 1 showing the hinge area of the cover.

Corresponding reference characters indicate corresponding parts throughout the several views of the drawings.

DESCRIPTION OF THE PREFERRED EMBODIMENT

Figure 4:
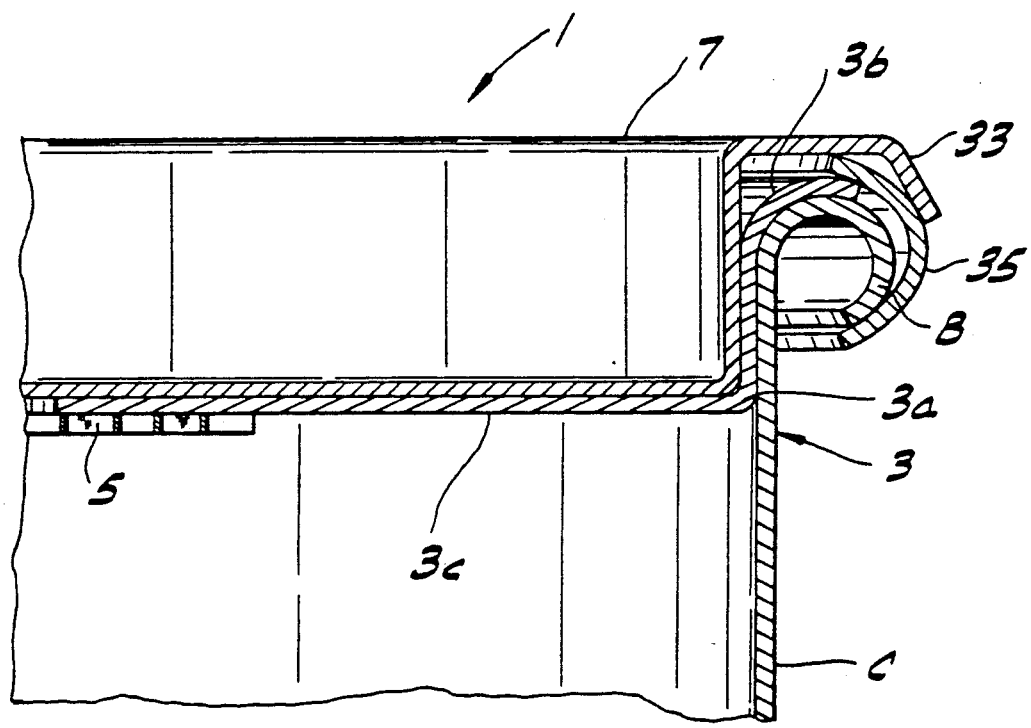
FIG. 4 is a cross-sectional view taken along the plane of line 4—4 of FIG. 1 showing the cover in its closed position.

In accordance with the present invention, a unique cover construction has been devised which permits liquid wastes to be readily disposed of while solid objects are effectively kept out of the interior of the waste container. The features of this cover overcome the problem of unwanted disposal of solid objects into the waste receptacle by providing a straining element which encloses the opening in the cover's annular support while the cover is in an open position. Further, since the cover may be releasably secured to the waste receptacle, the cover may be moved from one receptacle to the next as desired.

Referring now to the drawings, and first more particularly to FIG. 1, a cover of this invention for enclosing the open top of a container such as a liquid waste receptacle, is designated generally by the reference numeral 1. The cover consists principally of an annular support 3, a straining element 5, a lid 7, and hinge means 9 between the annular support and lid.

The annular support 3 is dimensioned to fit generally coaxially within the open top of the container C and defines an opening through which liquid wastes may be deposited into the interior of the waste receptacle. In a preferred embodiment, the annular support 3 consists of a rim 3a having an outline generally corresponding to that of the container C, and a lip 3b extending from the periphery of the rim 3a for engagement with the upper edge margin B of the open top of the container C. Preferably, the lip 3b of the annular support 3 flares upwardly and outwardly from the rim 3a to facilitate drainage of liquid waste through the opening in the annular support. The annular support 3 also includes an annular flange 3c, constituting flange means, extending inwardly from the rim 3a for attachment of the annular support 3 to the straining element 5 by spot welding, brazing or any other suitable means. As depicted in FIG. 1, in a preferred embodiment the straining element 4 is secured substantially continuously along its perimeter to the annular support 3. The annular flange 3c has an inner edge 3d defining the opening for passage of liquid materials into the container. Preferably, the flange is narrow to maximize the size of the opening in the annular support 3.

The cover contains means for releasably securing the annular support 3 to the upper edge margin B of the container C. As depicted in greater detail in FIG. 4, in a preferred embodiment, a ring clamp 35 is engageable with the lip 3b of the annular support 3 and with the upper edge margin B of the container C at the point where the lip 3b rests on the upper edge margin of the container and laterally encompasses this upper edge margin, thus permitting the cover to be releasably clamped onto the container C. In this embodiment, the ring clamp 35 is constructed so that it may be tightened to permit the annular support 3 to fit snugly over the upper edge margin B of the container C when the cover 1 is placed on the container C. Preferably, the annular support 3 and ring clamp 35 are dimensioned for fitting the upper edge margin of a fifty-five gallon drum. However, it is to be understood that the annular support 3 and ring clamp 35 could be dimensioned for smaller or larger containers without departing from the scope of this invention. In this embodiment, the ring clamp 35 is a split ring clamp having ends 11 and 13. As shown in FIG. 1, flanges 15 and 17 project radially outwardly from the ring clamp 35 near ends 11 and 13 and are secured together by a tie-bolt 19 passing through apertures in flanges 15 and 17. By tightening a nut 21 on the tie-bolt 19, the ring clamp 35 is secured snugly around the lip of the annular support 3 and the upper edge margin B of the container C. The cover 1 may be loosened and removed by reversing this procedure. The above-mentioned components of the cover 1 constitute means for releasably securing the annular support 3 to the upper edge margin of the container. Alternatively, the lip 3b of the annular support 3 may be constructed of a resilient metal or plastic dimensioned to snap over the upper edge margin and thereby releasably secure the cover to the upper edge margin of a container having a specific design or configuration.

The straining element 5 consists of a lattice-like structure such as a metal screen or grate and includes a plurality of holes 31. The straining element 5 lies in the opening defined by the annular support 3 and has a straining area coextensive with substantially the entire area of the opening in the annular support 3. The size chosen for the holes in the screen or grate may depend on the specific needs and desires of the user. Where the principal concern is large solid objects, such as gloves or bottles, the openings in the grate or screen may be relatively large, since only large solid objects need to be screened. The larger hole sizes will minimize the propensity for splashing or spillage which may be caused by pouring liquid waste through the straining element 5. However, if the specific needs of the company or industry using the waste container so require, the holes in the straining element may be relatively small to resist the entry of much smaller solid objects into the container, while still permitting liquid waste to be poured through the straining element 5.

The lid 7 is dimensioned to cover the opening in the annular support 3 when liquid waste is not being added to or removed from the container C and comprises a generally continuous surface which lies atop and seals off the straining element 5 when the lid 7 is in its closed position.

The lid 7 may have a downwardly curved lip 33, dimensioned for fitting snugly over the lip 3b of the annular support 3 and the ring clamp 35. A handle may be secured to the lid so that the lid may be moved more easily between its open and closed positions. Also, a latch may be added to more securely fasten the lid in its closed position and a gasket may be utilized between the lip of the lid and the rim.

The lid 7 is secured to the annular support 3 by hinge 9 so that the lid may be swung on the hinge between an open position in which the lid 7 is positioned away from the opening in the annular support 3 to provide access to the top of the container and a closed position in which the lid 7 completely covers the opening in the annular support 3 and seals against the annular support 3 to prevent materials within the container from escaping the container. The hinge may simply constitute a single unit of flexible metal or plastic with ends attached to the lid and annular support, respectively. Preferably, however, the hinge 9 comprises a hinge pin 23, a first hinge member 25, and a second hinge member 27. The hinge pin 23 swingably secures the first hinge member 25 to the second hinge member 27. As shown in FIGS. 1 and 3, the first hinge member 25 is fastened by the tie-bolt 19 between flanges 15 and 17 at one end, and is fastened to the hinge pin 23 at its other end. The second hinge member 27 may be welded or bolted to the lid 7 at one end and is attached to the hinge pin 23 at its other end.

Preferably, particularly where the lid is constructed of a somewhat heavy material, the cover 1 includes a stop 29 to prevent the lid from being opened beyond a predetermined angle, e.g., 135°, with respect to the plane of the upper surface of the container. The stop 29 eliminates the need to hold the lid while disposing of waste and keeps the lid from falling completely to the side of the container. Stop 29 is comprised of an extension of the end of hinge member 25.

In operation, the cover of this invention provides a method for disposing of liquid wastes into a waste receptacle, while resisting the placement or entry of solid objects of a predetermined maximum dimension into the receptacle. The lid 7 is opened and liquid waste is poured through the opening in the annular support 3 enclosed by the straining element 5. When the user does not desire to add or remove liquid waste materials, the lid is moved to its closed position. The adjustable ring clamp 35 makes it easy to releasably secure the cover 1 to the waste receptacle.

The invention is further directed to a method for disposing of liquid wastes while preventing useful articles or other solid objects from being disposed of with the liquid wastes. In accordance with the method, a liquid waste receptacle is provided with a cover 1 of the aforesaid type, which is installed on the container by placing the cover on the open top of the container. The liquid waste is poured through the opening in the annular support 3 enclosed by the straining element 5. If a worker attempts to dispose of work gloves or bottles of liquid waste into the waste receptacle, these will be caught in straining element 5 and prevented from entering the liquid waste in the container.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed:

1. A cover for use with a container, such as a liquid waste receptacle having an upper edge margin defining an open top of the container, for enclosing the open top, comprising:

an annular support dimensioned to fit generally coaxially within the open top of the container and defining an opening for passage of materials therethrough and into the container;

means for releasably securing the annular support to the upper edge margin of the container;

a straining element in the annular support having a straining area coextensive with substantially the entire area of the opening in said annular support for straining solid objects having a predetermined maximum dimension from entry into the container while permitting entry of liquids through the opening and into the container, the straining element and the annular support in combination defining an inner surface of the cover dimensioned so that a substantial portion of the inner surface is located below the upper edge margin of the container.

a lid dimensioned for covering the opening in the annular support;

hinge means for securing the lid to the annular support, the lid being swingable on said hinge means between an open position in which the lid is swung away from the opening in the annular support to provide access to the top of the container and a closed position in which the lid completely covers the opening in the annular support and seals against the annular support to prevent materials within the container from escaping out of the container; and a member at the hinge engageable with the lid to hold the lid at a predetermined angle.

2. A cover as set forth in claim 1 wherein said annular support comprises a rim having an outline generally corresponding to that of the container, and a lip extending from the periphery of the rim for engagement with the upper edge margin of the open top of the container.

3. A cover as set forth in claim 2 wherein said lip flares upwardly and outwardly from the rim to facilitate drainage of liquid waste through the opening in the annular support.

4. A cover as set forth in claim 2 wherein said rim has flange means extending inwardly from the rim, said straining element being attached to said flange means.

5. A cover as set forth in claim 3 wherein said flange means comprises an annular flange having an inner edge defining said opening for passage of materials into the container.

6. A cover as set forth in claim 5 wherein said flange is narrow to maximize the size of said opening.

7. A cover as set forth in claim 5 wherein said straining element comprises a metal screen affixed to said flange.

8. A cover as set forth in claim 2 wherein said means for releasably securing the annular support to the upper edge margin of the container comprises a ring clamp engageable with the lip of the annular support and with the upper edge margin of the container, and means for tightening the ring clamp to clamp the lip against the upper edge margin.

9. A cover as set forth in claim 1 wherein the straining element is secured to the annular support substantially continuously along its perimeter.

10. A cover as set forth in claim 1 wherein the hinge means comprises a hinge located substantially outside the open top of the container.

11. In combination, a 55-gallon drum having an upper edge margin defining an open top of the drum, and a cover retrofitted to clamp securely onto the open top of the drum, comprising:

an annular support dimensioned to fit generally coaxially within the open top of the drum and defining an opening for passage of materials therethrough and into the drum;

a ring clamp engageable with the annular support and with the upper edge margin of the drum, and means for tightening the ring clamp to clamp the annular support against the upper edge margin of the drum;

a straining element in the annular support having a straining area coextensive with substantially the entire area of the opening in said annular support for straining solid objects having a predetermined maximum dimension from entry into the drum while permitting entry of liquids through the opening and into the drum, the straining element and the annular support in combination defining an inner surface of the cover dimensioned so that a substantial portion of the inner surface is located below the level of the upper edge margin of the drum.

a lid dimensioned for covering the opening in the annular support; and hinge means for securing the lid to the annular support, the lid being swingable on said hinge means between an open position in which the lid is swung away from the opening in the annular support to provide access to the top of the container and a closed position in which the lid completely covers the opening in the annular support and seals against the annular support to prevent materials within the container from escaping out of the container.

12. The combination of claim 11 further comprising a member at the hinge engageable with the lid to hold the lid at a predetermined angle.

13. A method for disposing of liquid wastes while preventing useful articles or other solid objects from being disposed with the liquid wastes, the method comprising:

providing a cover for use with a container, such as a liquid waste receptacle, having an upper edge margin defining an open top of the container, for enclosing the open top, comprising:

an annular support dimensioned to fit generally coaxially within the open top of the container and defining an opening for passage of materials therethrough and into the container;

means for releasably securing the annular support to the upper edge margin of the container;

a straining element in the annular support having a straining area coextensive with substantially the entire area of the opening in said annular support for straining solid objects having a predetermined maximum dimension from entry into the container while permitting entry of the liquids through the opening and into the container, the straining element and the annular support in combination defining an inner surface of the cover dimensioned so that a substantial portion of the inner surface is located below the upper edge margin of the container;

a lid dimensioned for covering the opening in the annular support;

hinge means for securing the lid to the annular support, the lid being swingable on said hinge means between an open position in which the lid is swung away from the opening in the annular support to provide access to the top of the container and a closed position in which the lid completely covers the opening in the annular support to prevent materials within the container from scaping out of the container; and a member at the hinge engageable with the lid to hold the lid at predetermined angle;

installing the cover on the open top of the container; and dispensing the liquid wastes through the straining element of the cover and into the container thereby straining solid objects having a predetermined maximum dimension from entry into container.

* * * * *